United States Patent
Basu Mallick et al.

(10) Patent No.: US 11,564,096 B2
(45) Date of Patent: Jan. 24, 2023

(54) INTEGRITY PROTECTION FOR A PACKET DATA UNIT

(71) Applicant: Lenovo (Singapore) PTE. LTD., New Tech Park (SG)

(72) Inventors: Prateek Basu Mallick, Dreieich (DE); Andreas Kunz, Ladenburg (DE); Joachim Loehr, Wiesbaden (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 612 days.

(21) Appl. No.: 16/562,216

(22) Filed: Sep. 5, 2019

(65) Prior Publication Data

US 2020/0092727 A1    Mar. 19, 2020

Related U.S. Application Data

(60) Provisional application No. 62/731,036, filed on Sep. 13, 2018.

(51) Int. Cl.
*H04L 29/00* (2006.01)
*H04W 12/106* (2021.01)
*H04W 8/22* (2009.01)
*H04W 80/02* (2009.01)

(52) U.S. Cl.
CPC ......... *H04W 12/106* (2021.01); *H04W 8/22* (2013.01); *H04W 80/02* (2013.01)

(58) Field of Classification Search
CPC ..... H04W 12/106; H04W 8/22; H04W 80/02; H04W 12/037; H04L 1/0061; H04L 1/007
See application file for complete search history.

(56) References Cited

U.S. PATENT DOCUMENTS

| 2011/0188408 | A1  | 8/2011  | Yi et al. |
| 2016/0142518 | A1* | 5/2016  | Raina ................. H04W 28/0289 370/230 |
| 2017/0098088 | A1* | 4/2017  | Wu ........................ H04N 19/70 |
| 2017/0347297 | A1* | 11/2017 | Li ........................... H04W 36/14 |
| 2017/0353865 | A1* | 12/2017 | Li ....................... H04W 72/1284 |

(Continued)

FOREIGN PATENT DOCUMENTS

| CN | 101785280 A | * | 7/2010 | ............ H04W 80/02 |
| CN | 104427572 A | * | 3/2015 | ........... H04L 63/306 |

(Continued)

OTHER PUBLICATIONS

D. Rupprecht et al., "Breaking LTE on Layer Two", Alter-Attack, https://alter-attack.net, May 2019, pp. 1-5.

(Continued)

*Primary Examiner* — Don G Zhao
(74) *Attorney, Agent, or Firm* — Kunzler Bean & Adamson

(57) ABSTRACT

Apparatuses, methods, and systems are disclosed for integrity protection for a packet data unit. One method includes determining a first portion of a packet data unit, wherein the packet data unit includes the first portion and a second portion. The method includes applying an integrity protection function to the first portion of the packet data unit to result in an integrity protection indicator without applying the integrity protection function to the second portion of the packet data unit. The method includes transmitting the packet data unit with the integrity protection indicator.

20 Claims, 8 Drawing Sheets

(56) References Cited

U.S. PATENT DOCUMENTS

| | | | | |
|---|---|---|---|---|
| 2018/0287748 | A1* | 10/2018 | Kim | H04L 1/1874 |
| 2019/0045034 | A1* | 2/2019 | Alam | H04L 67/303 |
| 2019/0053099 | A1* | 2/2019 | Kim | H04W 28/065 |
| 2019/0230572 | A1* | 7/2019 | Cheng | H04W 28/24 |
| 2019/0306848 | A1* | 10/2019 | Zhou | H04W 72/0406 |
| 2021/0176740 | A1* | 6/2021 | Lee | H04W 72/044 |
| 2022/0030659 | A1* | 1/2022 | Kim | H04L 1/1896 |
| 2022/0053367 | A1* | 2/2022 | Rao | H04L 1/188 |
| 2022/0060277 | A1* | 2/2022 | Wei | H04L 5/0083 |

FOREIGN PATENT DOCUMENTS

| | | | | | |
|---|---|---|---|---|---|
| CN | 106411676 | A | * | 2/2017 | H04L 12/4633 |
| CN | 104811928 | B | * | 6/2018 | H04W 8/18 |
| CN | 110249607 | A | * | 9/2019 | H04L 63/061 |
| CN | 110463270 | A | * | 11/2019 | H04B 7/2606 |
| CN | 110637476 | A | * | 12/2019 | H04L 43/028 |
| CN | 110326357 | B | * | 6/2021 | H04L 1/0045 |
| WO | 2018031603 | A1 | | 2/2018 | |
| WO | WO-2018144233 | A1 | * | 8/2018 | H04L 1/0083 |
| WO | WO-2018176480 | A1 | * | 10/2018 | H04L 1/0045 |
| WO | 2019159788 | A1 | | 8/2019 | |

OTHER PUBLICATIONS

GSMA, "LTE and the upcoming 5G standard", 3GPP TSG SA WG3 (Security) Meeting #91 S3-181429, Apr. 16-20, 2018, pp. 1-4.

3GPP, "3rd Generation Partnership Project; Technical Specification Group Radio Access Network; NR; Medium Access Control (MAC) protocol specification (Release 15)", 3GPP TS 38.321 V15.2.0, Jun. 2018, pp. 1-73.

3GPP, "3rd Generation Partnership Project; Technical Specification Group Services and System Aspects; Procedures for the 5G System; Stage 2 (Release 15)", 3GPP TS 23.502 V15.2.0, Jun. 2018, pp. 1-308.

3GPP, "3rd Generation Partnership Project; Technical Specification Group Radio Access Network; NR; Radio Resource Control (RRC) protocol specification (Release 15)", 3GPP TS 38.331 V15.2.1, Jun. 2018, pp. 1-303.

3GPP SA3, "Reply to LS on LTE and the upcoming 5G standard", 3GPP TSG-SA WG3 Meeting #91 S3-181443, Apr. 16-20, 2018, p. 1.

3GPP, "3rd Generation Partnership Project; Technical Specification Group Services and System Aspects; Security architecture and procedures for 5G system (Release 15)", 3GPP TS 33.501 V15.1.0, Jun. 2018, pp. 1-152.

3GPP, "3rd Generation Partnership Project; Technical Specification Group Services and System Aspects; Study on the security aspects of the next generation system (Release 14)", 3GPP TR 33.899 V1.3.0, Aug. 2017, pp. 1-605.

3GPP, "3rd Generation Partnership Project; Technical Specification Group Services and System Aspects; System Architecture for the 5G System; Stage 2 (Release 15)", 3GPP TS 23.501 V15.2.0, Jun. 2018, pp. 1-217.

PCT/IB2019/000983, "Notification of Transmittal of the International Search Report and the Written Opinion of the International Searching Authority, or the Declaration", PCT International Searching Authority, dated Jan. 21, 2020 pp. 1-13.

Lenovo, "Achieving higher data rates for UP IP", S3-182942, 3GPP TSG SA WG3 (Security) Meeting #92 ad-hoc, Sep. 24-28, 2018, pp. 1-2.

* cited by examiner

500

600

700

800

INTEGRITY PROTECTION FOR A PACKET DATA UNIT

CROSS-REFERENCE TO RELATED APPLICATIONS

This application claims priority to U.S. Patent Application Ser. No. 62/731,036 entitled "EFFICIENTLY INCREASING SECURITY PROTECTION IN A WIRELESS SYSTEM" and filed on Sep. 13, 2018 for Prateek Basu Mallick, which is incorporated herein by reference in its entirety.

FIELD

The subject matter disclosed herein relates generally to wireless communications and more particularly relates to integrity protection for a packet data unit.

BACKGROUND

The following abbreviations are herewith defined, at least some of which are referred to within the following description: Third Generation Partnership Project ("3GPP"), 5$^{th}$ Generation ("5G"), Positive-Acknowledgment ("ACK"), Aggregation Level ("AL"), Access and Mobility Management Function ("AMF"), Access Point ("AP"), Beam Failure Detection ("BFD"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Control Channel Element ("CCE"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSP"), Channel State Information-Reference Signal ("CSI-RS"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Domain Name Server ("DNS"), Data Radio Bearer ("DRB"), Discontinuous Reception ("DRX"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Integrity Protection ("IP"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Log-Likelihood Ratio ("LLR"), Long Term Evolution ("LTE"), Multiple Access ("MA"), Medium Access Control ("MAC"), Message Authentication Code-Integrity ("MAC-I"), Message Authentication Code for NAS ("NAS-MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), NR Encryption Algorithm and NR Integrity ("NIA"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function (""PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Primary Secondary Cell ("PSCell"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Monitoring ("RLM"), Radio Network Temporary Identifier ("RNTI"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Service Level Agreement ("SLA"), Session Management ("SM"), Session Management Function ("SMF"), Special Cell ("SpCell"), Single Network Slice Selection Assistance Information ("S-NSSAI"), Signaling Radio Bearer ("SRB"), Shortened TTI ("sTTI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), Worldwide Interoperability for Microwave Access ("WiMAX"), Expected MAC ("X-MAC"), and Expected MAC-INAS-MAC ("XMAC-I/XNAS-MAC").

In certain wireless communications networks, integrity protection may be used. In such networks, a large amount of processing power may be used for the integrity protection.

BRIEF SUMMARY

Methods for integrity protection for a packet data unit are disclosed. Apparatuses and systems also perform the functions of the method. One embodiment of a method includes determining a first portion of a packet data unit, wherein the packet data unit includes the first portion and a second portion. In some embodiments, the method includes applying an integrity protection function to the first portion of the packet data unit to result in an integrity protection indicator without applying the integrity protection function to the second portion of the packet data unit. In certain embodiments, the method includes transmitting the packet data unit with the integrity protection indicator.

One apparatus for integrity protection for a packet data unit includes a processor that: determines a first portion of a packet data unit, wherein the packet data unit includes the first portion and a second portion; and applies an integrity protection function to the first portion of the packet data unit to result in an integrity protection indicator without applying the integrity protection function to the second portion of the packet data unit. In various embodiments, the apparatus includes a transmitter that transmits the packet data unit with the integrity protection indicator.

One method for integrity protection for a packet data unit includes receiving a packet data unit with an integrity protection indicator, wherein an integrity protection function is applied to a first portion of the packet data unit to result in the integrity protection indicator without applying the integrity protection function to a second portion of the packet data unit.

One apparatus for integrity protection for a packet data unit includes a receiver that receives a packet data unit with an integrity protection indicator, wherein an integrity protection function is applied to a first portion of the packet data unit to result in the integrity protection indicator without applying the integrity protection function to a second portion of the packet data unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
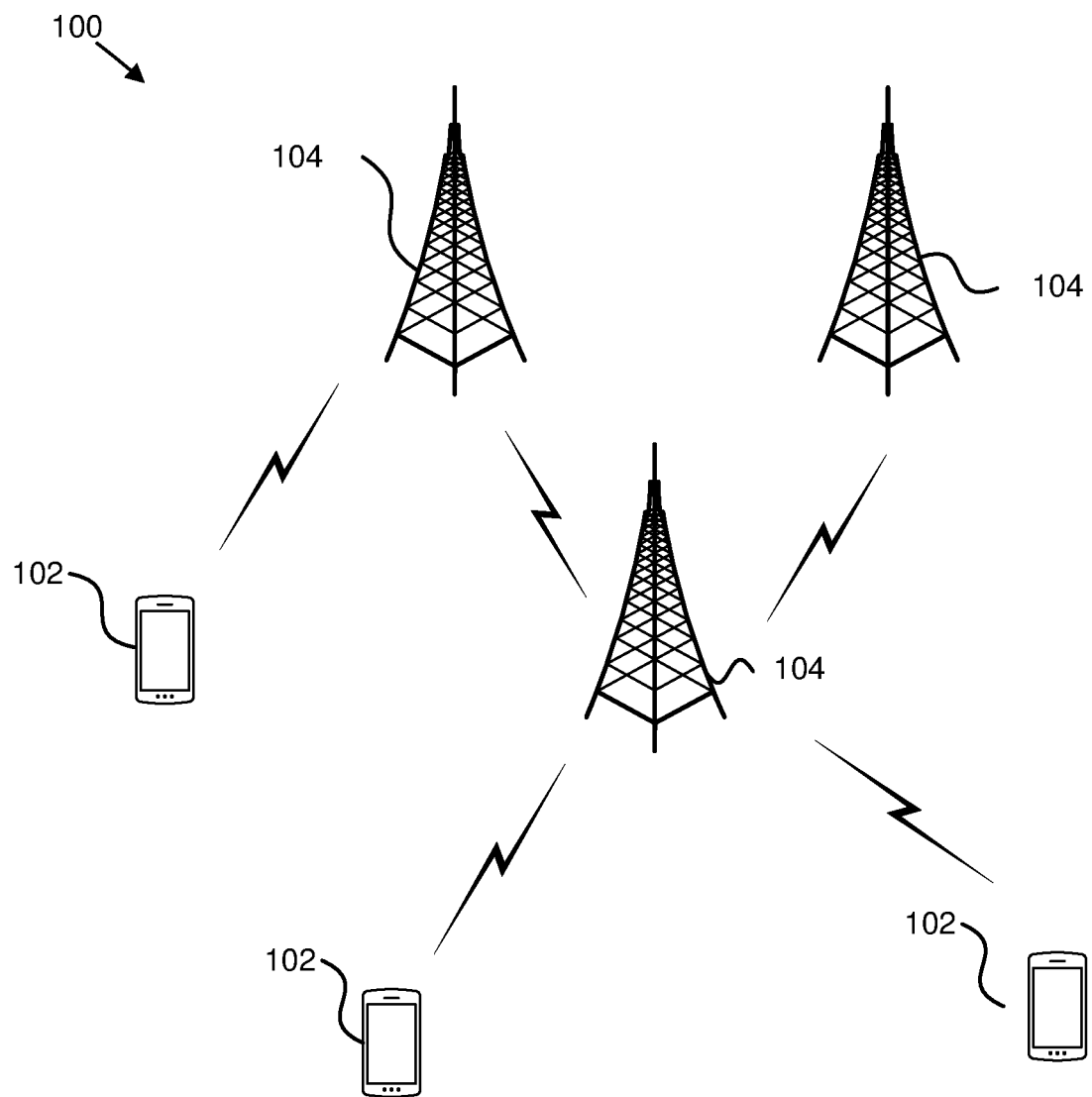
FIG. 1 is a schematic block diagram illustrating one embodiment of a wireless communication system for integrity protection for a packet data unit.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for integrity protection for a packet data unit. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may determine a first portion of a packet data unit, wherein the packet data unit includes the first portion and a second portion. In some embodiments, the remote unit 102 may apply an integrity protection function to the first portion of the packet data unit to result in an integrity protection indicator without applying the integrity protection function to the second portion of the packet data unit. In certain embodiments, the remote unit 102 may transmit the packet data unit with the integrity protection indicator. Accordingly, the remote unit 102 may be used for integrity protection for a packet data unit.

In certain embodiments, a network unit 104 may receive a packet data unit with an integrity protection indicator, wherein an integrity protection function is applied to a first portion of the packet data unit to result in the integrity protection indicator without applying the integrity protection function to a second portion of the packet data unit. Accordingly, the network unit 104 may be used for integrity protection for a packet data unit.

Figure 2:
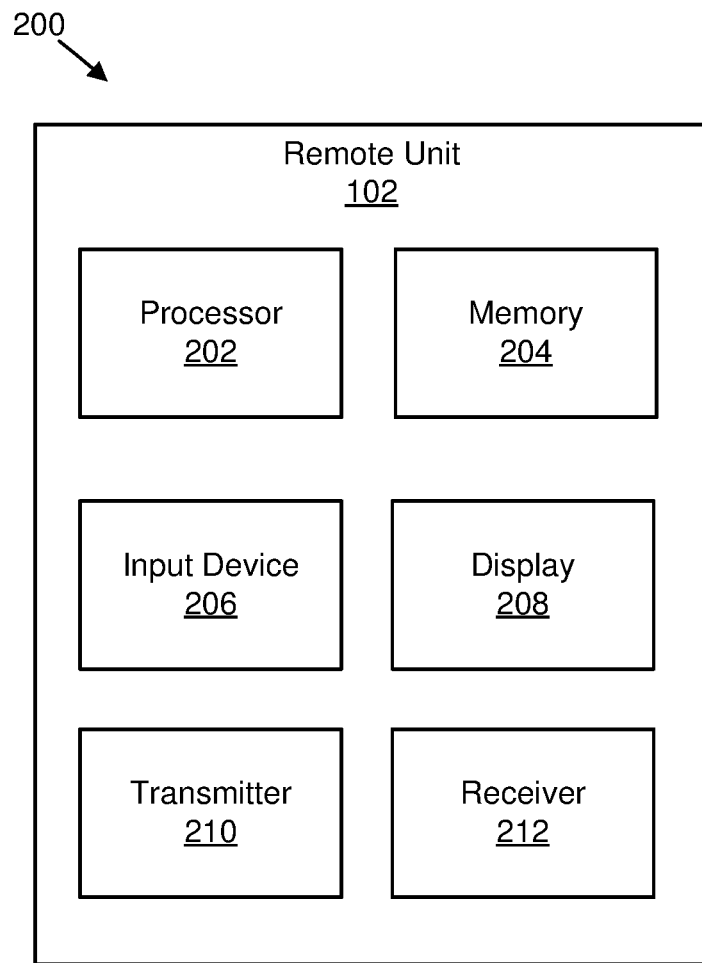
FIG. 2 is a schematic block diagram illustrating one embodiment of an apparatus that may be used for integrity protection for a packet data unit.

FIG. 2 depicts one embodiment of an apparatus 200 that may be used for integrity protection for a packet data unit. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: determine a first portion of a packet data unit, wherein the packet data unit includes the first portion and a second portion; and apply an integrity protection function to the first portion of the packet data unit to result in an integrity protection indicator without applying the integrity protection function to the second portion of the packet data unit. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In one embodiment, the transmitter 210 may transmit the packet data unit with the integrity protection indicator. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
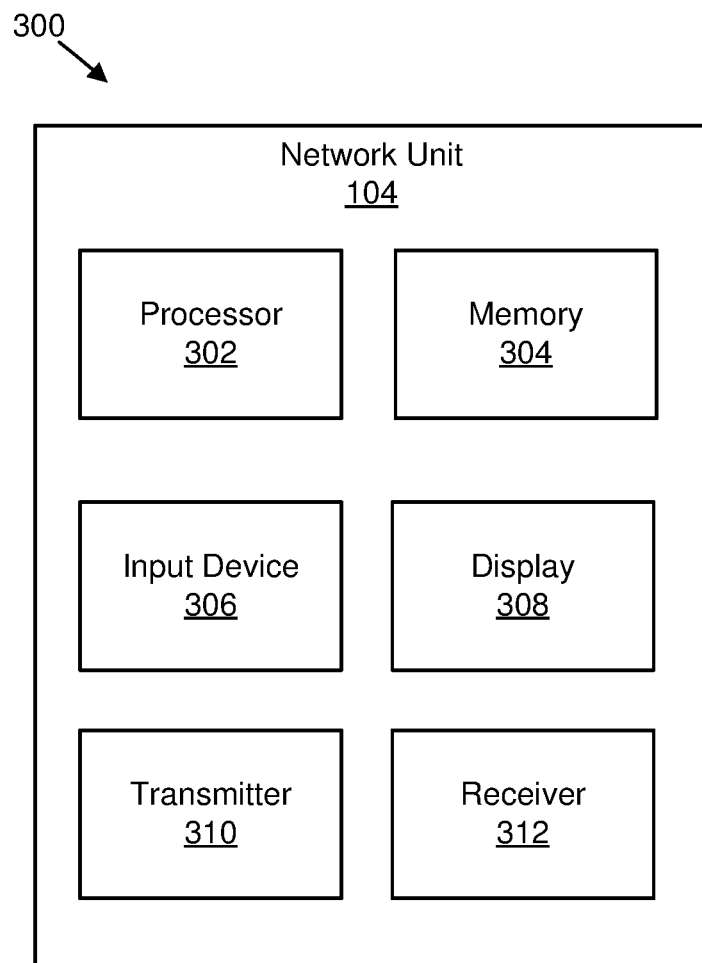
FIG. 3 is a schematic block diagram illustrating one embodiment of an apparatus that may be used for integrity protection for a packet data unit.

FIG. 3 depicts one embodiment of an apparatus 300 that may be used for integrity protection for a packet data unit. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In one embodiment, the receiver 312 receives a packet data unit with an integrity protection indicator, wherein an integrity protection function is applied to a first portion of the packet data unit to result in the integrity protection indicator without applying the integrity protection function to a second portion of the packet data unit.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some configurations, applying integrity protection may require more processing power and/or other resources than are available.

Figure 4:
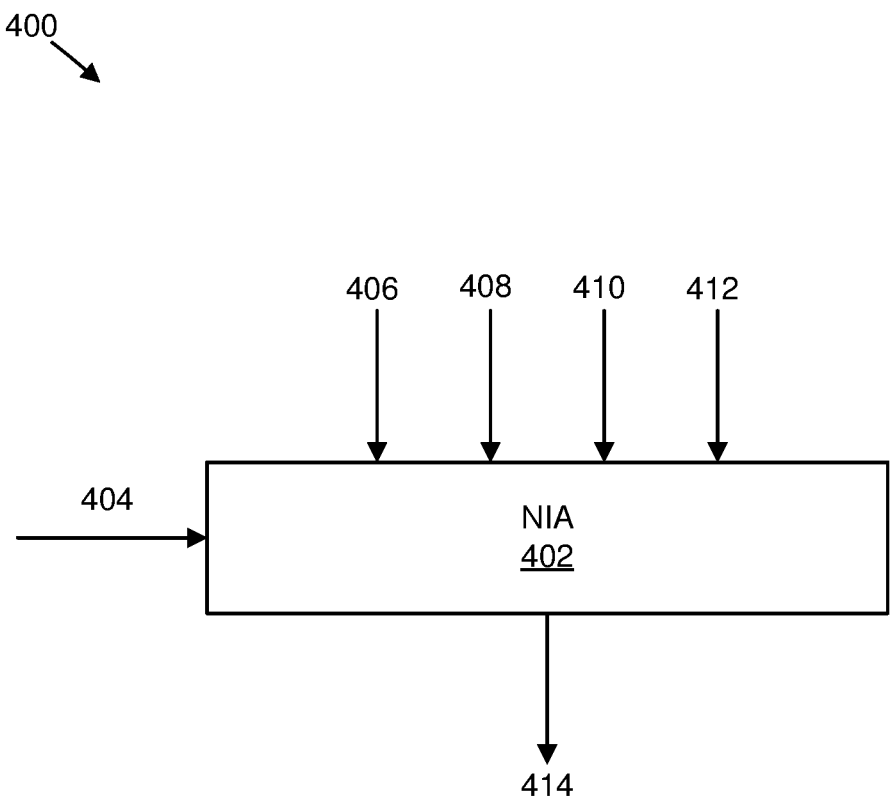
FIG. 4 is a schematic block diagram illustrating one embodiment of an apparatus that determines a message authentication code.

FIG. 4 is a schematic block diagram illustrating one embodiment of an apparatus 400 that determines a message authentication code. The apparatus 400 includes an NIA 402 that operates an integrity algorithm having a first input parameter 404, a second input parameter 406, a third input parameter 408, a fourth input parameter 410, a fifth input parameter 412, and an output parameter 414.

The first input parameter 404 includes a 128-bit integrity key named KEY (e.g., the integrity protection keys for the control plane and for the user plane are $K_{RRCint}$ and $K_{UPint}$, respectively), the second input parameter 406 includes a 32-bit COUNT, the third input parameter 408 includes the message itself (e.g., MESSAGE), the fourth input parameter 410 includes a 1-bit direction of the transmission (e.g., DIRECTION), and the fifth input parameter 412 includes a 5-bit bearer identity called BEARER (e.g., defined as the radio bearer identifier in TS 33.501. It will use the value RB identity −1 as in TS 38.331). The DIRECTION bit may be 0 for uplink and 1 for downlink. The bit length of the MESSAGE may have a length "M."

Based on these input parameters a sender computes the output parameter 414 that includes a 32-bit message authentication code (e.g., MAC-I/NAS-MAC) using the NIA 402. The message authentication code is then appended to the message when sent. For integrity protection algorithms, the receiver computes the expected message authentication code (e.g., XMAC-I/XNAS-MAC) on the message received in the same way as the sender computed its message authentication code on the message sent and verifies the data integrity of the message by comparing it to the received message authentication code (e.g., MAC-I/NAS-MAC).

In certain configurations, increasing a processing capacity of chipsets may facilitate performing integrity protection on long messages; however, this is not currently possible, so other methods and/or embodiments are described herein to obviate a need for extra processing capacity for integrity protection.

In one embodiment, for UL traffic, a network (e.g., via RRC) configures a length of IP protection for a data bearer. The configuration information may be transmitted to a UE as part of PDCP configuration. In some embodiments, for DL traffic, a network may also configure a length of IP protection for a data bearer. The configuration information may be transmitted to a UE so that the UE may verify an integrity protection (e.g., generate a X-MAC). In certain embodiments, a network may configure and use the same parameter length of IP protection for a data bearer for both UL and DL. As may be appreciated, keys and the integrity protection algorithm may be configured in any suitable manner. In various embodiments, for downlink and uplink integrity protection and verification, parameters that are used by PDCP for integrity protection may be defined in TS 33.501 and may be input to the integrity protection algorithm.

In some embodiments, a network may calculate a length of IP protection for a data bearer based on a UE capability corresponding to a data rate for IP protection. For example, if the UE is able to integrity protect up to 64 Kbps and a corresponding bearer may be scheduled by the network every 10 ms to fulfill its QOS requirements, then the length of the IP protection for the data bearer is 640 bits. In such an example, the transmitting PDCP may then calculate a partial-MAC-I on only 640 bits regardless of an actual payload size of the data bearer. The data unit that is then integrity protected is 640 truncated bits containing a PDU header and a portion of the PDU data (e.g., before ciphering). In certain embodiments, a UE computes a value for the partial-MAC-I field as described herein and at reception, the receiving device verifies the integrity of the PDCP data PDU by calculating the partial-X-MAC based on the input parameters as described herein using the length of the IP protection for a data bearer bits. If the calculated partial-X-MAC corresponds to the received partial-MAC-I, integrity protection may be verified successfully.

Figure 5:
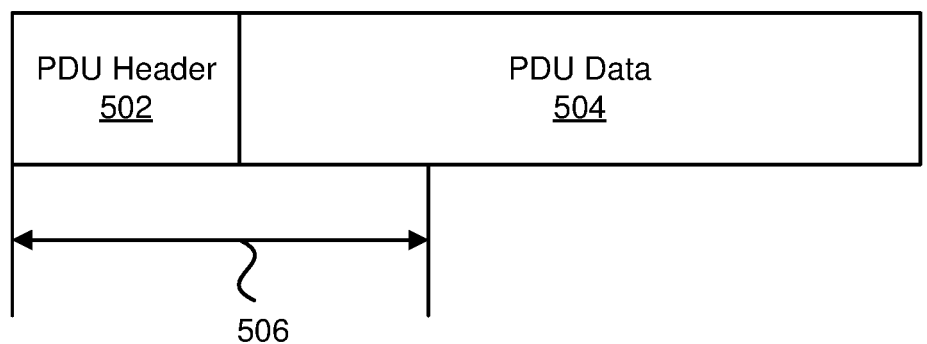
FIG. 5 is a schematic block diagram illustrating one embodiment of a packet data unit message.

FIG. 5 is a schematic block diagram illustrating one embodiment of a packet data unit message 500. The packet data unit message 500 includes a PDU header 502 and PDU data 504. As described above, a selection of a portion 506 of the packet data unit message 500 is made in order to integrity protect only the portion 506.

Figure 6:
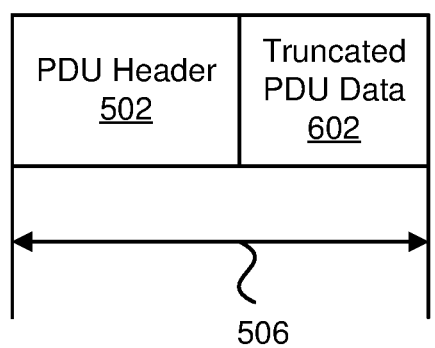
FIG. 6 is a schematic block diagram illustrating one embodiment of a truncated packet data unit message.

FIG. 6 is a schematic block diagram illustrating one embodiment of a truncated packet data unit message 600. The truncated packet data unit message 600 includes the PDU header 502 and truncated PDU data 602.

In some embodiments, a location of a bit string to be IP protected may be configured by a network, and the configuration information transmitted to a UE. In one example, if a length of the IP protection for a data bearer equals 640 bits, a location may indicate whether the 640 bits are at the front (e.g., the first bits of the data unit starting with the PDU header), at the end (e.g., the last bits of the data unit ending with the data part of the PDU before ciphering), or at a configured location (e.g., offset) from the first bit of the data unit starting with the PDU header. In one embodiment, special values of an offset may indicate the offset (e.g., location of the IP data in the PDU) as zero to signify the front, and another special value of an offset may signify the end.

Figure 7:
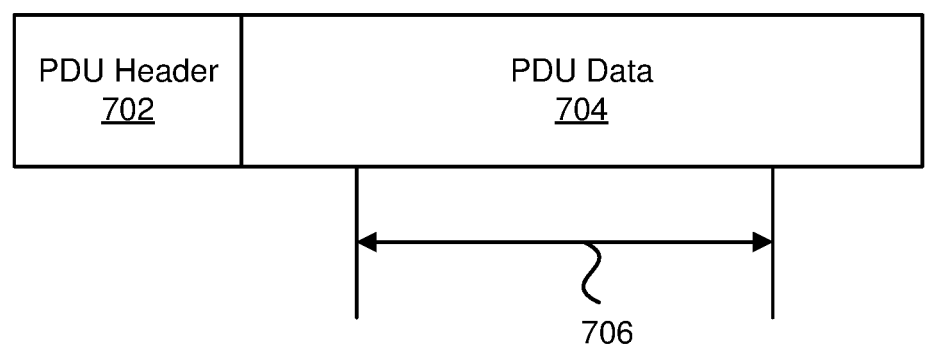
FIG. 7 is a schematic block diagram illustrating another embodiment of a packet data unit message.

FIG. 7 is a schematic block diagram illustrating another embodiment of a packet data unit message 700. The packet data unit message 700 includes a PDU header 702 and PDU data 704. As described above, a selection of a portion 706 of the packet data unit message 700 is made in order to integrity protect only the portion 706.

Figure 8:
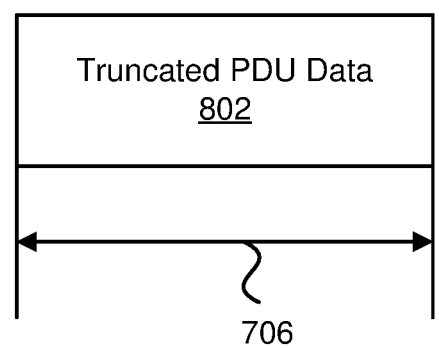
FIG. 8 is a schematic block diagram illustrating another embodiment of a truncated packet data unit message.

FIG. 8 is a schematic block diagram illustrating another embodiment of a truncated packet data unit message 800. The truncated packet data unit message 800 includes the PDU header 702 and truncated PDU data 802.

As described herein, a MAC-I calculated on only a portion of a PDU message may be considered a partial-MAC-I (or short-MAC-X) to distinguish it from MAC-I that is calculated over an entire PDU header and the entire data part of the PDU before ciphering. In some embodiments, a partial-MAC-I field carries a message authentication code calculated as specified in subclause 5.9 of TS 38-321-f20. In such embodiments, a Partial-MAC-I field may have a length of 32 bits and may be present at the end of the PDCP Data PDU.

In certain embodiments, a UE capability indication may be used to indicate that the UE is able to compute a partial-MAC-I and partial-X-MAC. In such embodiments, this capability may be signaled to the network using an RRC message (e.g., for transmission to a RAN network) or NAS signaling (e.g., for transmission to a Core Network). The Core Network may decide or assist the RAN network in deciding on appropriate values of length and/or location fields and which bearers/QOS flows/PDU session to use efficient integrity protection (e.g., partial-MAC-I and/or partial-X-MAC). In various embodiments, configuration of a UE may be on a per bearer basis, a per PDU session basis, or a per UE basis. In some embodiments, for every bearer it may be signaled if efficient integrity protection is to be applied for the bearer and corresponding length and/or location parameters may be bearer-specific configured. Once configured, efficient integrity protection may be applied for all bearers and corresponding length and/or location parameters may be common to all bearers. An example of one embodiment of a signaling structure is shown in Table 1 and Table 2.

TABLE 1

| PDCP-Config Information Element |
|---|
| -- ASN1START |
| -- TAG-PDCP-CONFIG-START |
| PDCP-Config ::=         SEQUENCE { |
|    drb                             SEQUENCE { |
|      discardTimer           ENUMERATED {ms10, ms20, ms30, ms40, ms50, ms60, ms75, ms100, ms150, ms200, ms250, ms300, ms500, ms750, ms1500, infinity}          OPTIONAL, -- Cond Setup |
|      pdcp-SN-SizeUL         ENUMERATED {len12bits, len18bits}          OPTIONAL, -- Cond Setup2 |
|      pdcp-SN-SizeDL         ENUMERATED {len12bits, len18bits}          OPTIONAL, -- Cond Setup2 |
|      headerCompression      CHOICE { |
|        notUsed               NULL, |
|        rohc                  SEQUENCE { |
|          maxCID             INTEGER (1..16383)             DEFAULT 15, |
|          profiles            SEQUENCE { |
|            profile0x0001      BOOLEAN, |
|            profile0x0002      BOOLEAN, |
|            profile0x0003      BOOLEAN, |

TABLE 1-continued

PDCP-Config Information Element

```
                profile0x0004           BOOLEAN,
                profile0x0006           BOOLEAN,
                profile0x0101           BOOLEAN,
                profile0x0102           BOOLEAN,
                profile0x0103           BOOLEAN,
                profile0x0104           BOOLEAN
            },
            drb-ContinueROHC            ENUMERATED { true }   OPTIONAL   -- Need R
        },
        uplinkOnlyROHC          SEQUENCE {
            maxCID                      INTEGER (1..16383)              DEFAULT 15,
            profiles                    SEQUENCE {
                profile0x0006           BOOLEAN
            },
            drb-ContinueROHC            ENUMERATED { true }   OPTIONAL   -- Need R
        },
        ...
    },
    integrityProtection         ENUMERATED { enabled }   OPTIONAL,  -- Cond ConnectedTo5GC
    length                      ENUMERATED {B4, B8, B16, B32, B64, B128, B256, B512, B1024,
B2048, B4096, B8192, B16384, B32768, B65536, all}                OPTIONAL,
    location                    ENUMERATED {B0, B8, B16, B32, B64, B128, B256, B512, B1024,
B2048, B4096, B8192, B16384, B32768, B65536, end}                OPTIONAL,
    statusReportRequired        ENUMERATED { true }      OPTIONAL,  -- Cond Rlc-AM
    outOfOrderDelivery          ENUMERATED { true }      OPTIONAL   -- Need R
}                                                                OPTIONAL,  -- Cond DRB
    moreThanOneRLC          SEQUENCE {
        primaryPath                 SEQUENCE {
            cellGroup                   CellGroupId             OPTIONAL,  -- Need R
            logicalChannel              LogicalChannelIdentity  OPTIONAL   -- Need R
        },
        ul-DataSplitThreshold       UL-DataSplitThreshold       OPTIONAL, -- Cond SplitBearer
        pdcp-Duplication            BOOLEAN                     OPTIONAL   -- Need R
}                                                                OPTIONAL, -- Cond MoreThanOneRLC
    t-Reordering                ENUMERATED {
                ms0, ms1, ms2, ms4, ms5, ms8, ms10, ms15, ms20, ms30, ms40,
ms50, ms60, ms80, ms100, ms120, ms140, ms160, ms180, ms200, ms220, ms240, ms260, ms280, ms300,
    ms500, ms750, ms1000, ms1250, ms1500, ms1750, ms2000, ms2250, ms2500, ms2750,ms3000, spare28,
spare27, spare26, spare25, spare24, spare23, spare22, spare21, spare20, spare19, spare18, spare17,
spare16, spare15, spare14, spare13, spare12, spare11, spare10, spare09, spare08, spare07, spare06,
spare05, spare04, spare03, spare02, spare01 }   OPTIONAL, -- Need S
    ...,
    [[
        cipheringDisabled           ENUMERATED {true}        OPTIONAL   -- Cond ConnectedTo5GC
    ]]
}
UL-DataSplitThreshold ::= ENUMERATED { b0, b100, b200, b400, b800, b1600, b3200, b6400, b12800,
b25600, b51200, b102400, b204800, b409600, b819200, b1228800, b1638400, b2457600, b3276800,
b4096000, b4915200, b5734400, b6553600, infinity, spare8, spare7, spare6, spare5, spare4, spare3,
spare2, spare1}
-- TAG-PDCP-CONFIG-STOP
-- ASN1STOP
```

TABLE 2

PDCP-Config Field Descriptions

| Field | Description |
|---|---|
| Length | Indicates the "length of the IP protection for a data bearer" i.e. length of the data unit over which the MAC-I (referred as partial-MAC-I in the embodiment) is calculated. Values are in Bytes; B4 refers to a length of 4 Bytes, B8 refers to a length of 8 Bytes, and so on. Value "all" indicates that the MAC-I calculation is over the data unit containing the entire PDU header and the data part of the PDU before ciphering. |
| Location | Indicates the Byte offset (from the start of the PDCP Header) as the start position for the "length". Value B0 indicates that the "length" starts from the first bit of the PDCP header. Value "end" indicates that the "length" ends at the last bit of the PDCP data part. |

In various embodiments, a length of IP protection for a data bearer and/or location may be included by a transmitter (e.g., UE) as part of a PDCP header. In such embodiments, the length and/or location fields may be ciphered or may not be ciphered. In some embodiments, a partial-MAC-I is computed before ciphering but ciphering is applied to the length of the IP protection for a data bearer and/or the location parameters. In such embodiments, the partial-MAC-I may not be ciphered. Furthermore, a receiver, upon receiving the PDCP PDU, may know which part of the PDCP PDU are to be used as the MESSAGE to calculate a partial-MAC-I (or short-X-MAC).

TABLE 3

PDCP Data PDU Format

| D/C | Partial MAC-I- Presence | R | R | PDCP SN |
|---|---|---|---|---|
| | PDCP SN (Cont.) | | | |
| | Length | | | Offset/Location |
| | Data | | | |
| | ... | | | |
| | MAC-I (optional) | | | |
| | MAC-I (Cont.) (optional) | | | |
| | MAC-I (Cont.) (optional) | | | |
| | MAC-I (Cont.) (optional) | | | |

As shown in Table 3, one of the reserved bits of the PDCP data PDU format may be used as a partial MAC-I-presence indication field to indicate whether a length (e.g., length of IP protection for a data bearer) and/or location field follow the PDCP SN. In some embodiments, two reserved bits may be used to separately indicate whether length or location fields follows the PDCP SN. Table 3 shows both of the length and the location fields as 4 bit fields; however, other sizes of fields may be used. In some embodiments, 4 bit fields may indicate index values used to point to a table with indices corresponding to some specified length for each of the index values. In various embodiments, a field partial MAC-I-presence may only indicate if a length (e.g., length of IP protection for a data bearer) is included, and there may be no location field.

In certain embodiments, a length of IP protection for a data bearer and/or a location may be included by a transmitter based on information received from higher layers about whether there is sensitive information (e.g., an internet protocol address and/or DNS address) contained in the PDCP SDU.

In various embodiments, a location may be set dynamically and may be different per packet. In some embodiments, if a length exceeds an actual PCDP packet size, a location may be set to zero and the full PDCP packet may be integrity protected. In certain embodiments, if a location plus length exceeds a PDCP packets size, a lower value for the location may be considered to use the length for a MAC-I calculation.

In some embodiments, a transmitter may include a MAC-I (or a Partial-MAC-I) only if necessary (e.g., if higher layers indicate that a PDCP SDU is to be integrity protected). In such embodiments, this may be done using a reserved bit to indicate the presence of a MAC-I (or a Partial-MAC-I) at an end of the PDCP PDU. Furthermore, a receiver may compute the an X-MAC (or a Partial-X-MAC) only if the transmitter indicates that a MAC-I (or a Partial-MAC-I) is present; otherwise, an integrity protection check may not be performed.

In various embodiments, a UE signals support of partial integrity protection within its UE capabilities and signals a maximum supported bitrate for integrity protection to an AMF during a registration procedure or during a service request procedure, such as defined in 3GPP TS 23.502.

In some embodiments, at a time of a PDU session request, such as according to TS 23.502, an AMF may provide a partial integrity protection capability to an SMF. The SMF may create an SM context and may responds to the AMF with a security policy for a PDU session. In certain embodiments, if UP integrity protection in a security policy is set to "Required," but a data rate of a PDU session exceeds a UE integrity protection maximum data rate, then an SMF may indicate that partial integrity protection should be used for the PDU session.

In various embodiments, a security policy is forwarded from an AMF to a gNB, and the gNB ensures that a UE integrity protection maximum data rate is not exceeded even if an overall data rate of a PDU Session is higher than the UE integrity protection maximum data rate.

Figure 9:
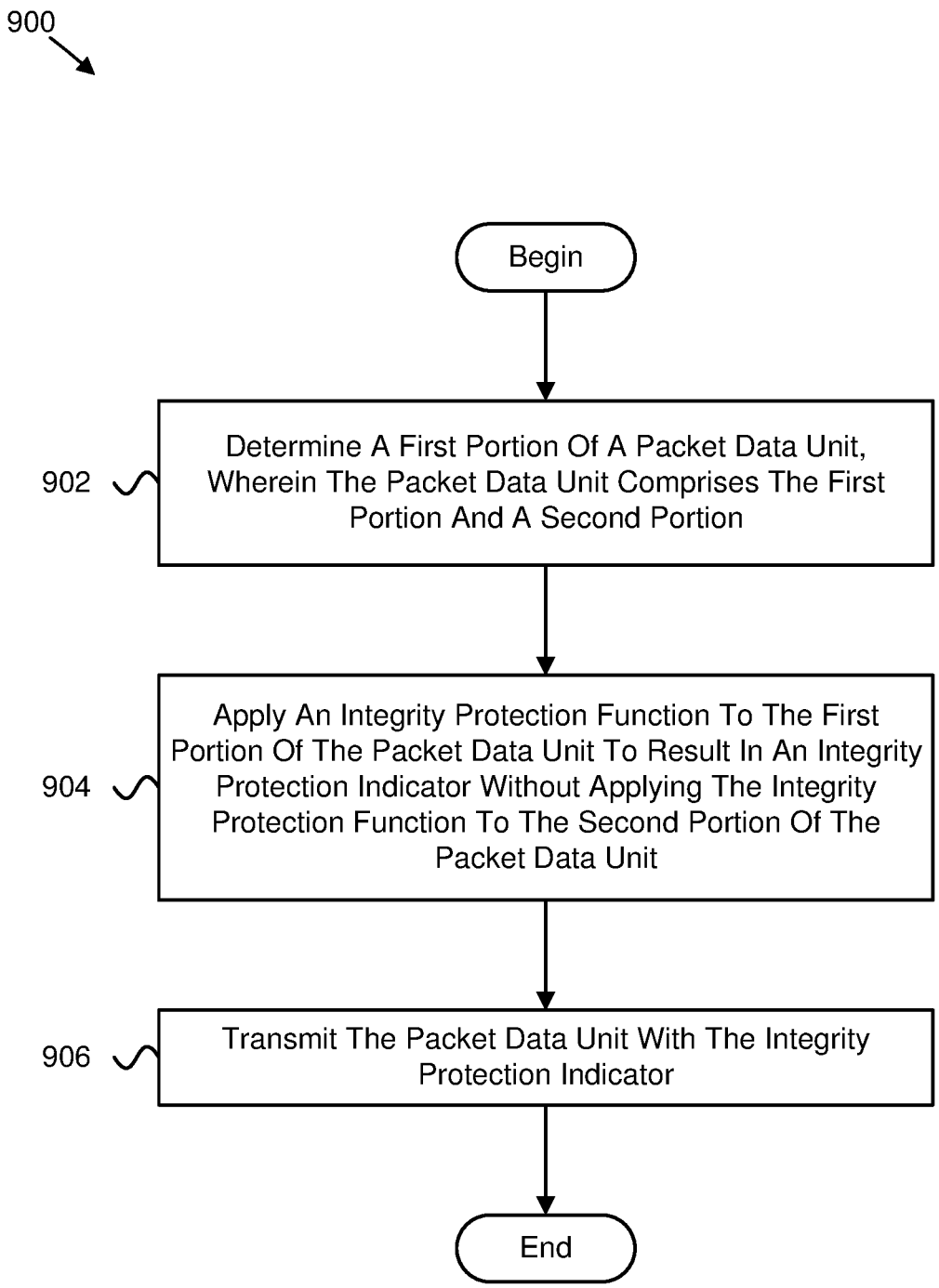
FIG. 9 is a flow chart diagram illustrating one embodiment of a method for integrity protection for a packet data unit.

FIG. 9 is a flow chart diagram illustrating one embodiment of a method 900 for integrity protection for a packet data unit. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include determining 902 a first portion of a packet data unit, wherein the packet data unit includes the first portion and a second portion. In some embodiments, the method 900 includes applying 904 an integrity protection function to the first portion of the packet data unit to result in an integrity protection indicator without applying the integrity protection function to the second portion of the packet data unit. In certain embodiments, the method 900 includes transmitting 906 the packet data unit with the integrity protection indicator.

In certain embodiments, the method 900 further comprises receiving information indicating a length of the portion of the packet data unit. In some embodiments, the information indicating the length is received as part of a packet data convergence protocol configuration via a radio resource control message. In various embodiments, the length of the portion of the packet data unit is determined based on a user equipment capability corresponding to integrity protection.

In one embodiment, the method 900 further comprises receiving information indicating a location of the portion of the packet data unit within the packet data unit. In certain embodiments, the information indicating the location comprises an offset. In some embodiments, the method 900 further comprises transmitting information indicating a length of the portion of the packet data unit.

In various embodiments, the method 900 further comprises transmitting information indicating a location of the portion of the packet data unit. In one embodiment, the method 900 further comprises transmitting information indicating whether the integrity protection indicator is present. In certain embodiments, the information indicating the length, the location, and the integrity protection indicator is part of a header of a packet data convergence protocol message. In some embodiments, the header is ciphered.

In various embodiments, the method 900 further comprises, in response to the information indicating that the integrity protection indicator is not present, not transmitting information indicating the length of the portion of the packet data unit and the location of the portion of the packet data unit. In one embodiment, transmitting the entire packet data unit with the integrity protection indicator comprises transmitting the integrity protection indicator if a higher layer indicates to apply integrity protection and applying integrity protection. In certain embodiments, the method 900 further comprises transmitting information indicating an ability to support partial integrity protection and a maximum supported bitrate for integrity protection to an access and mobility management function.

Figure 10:
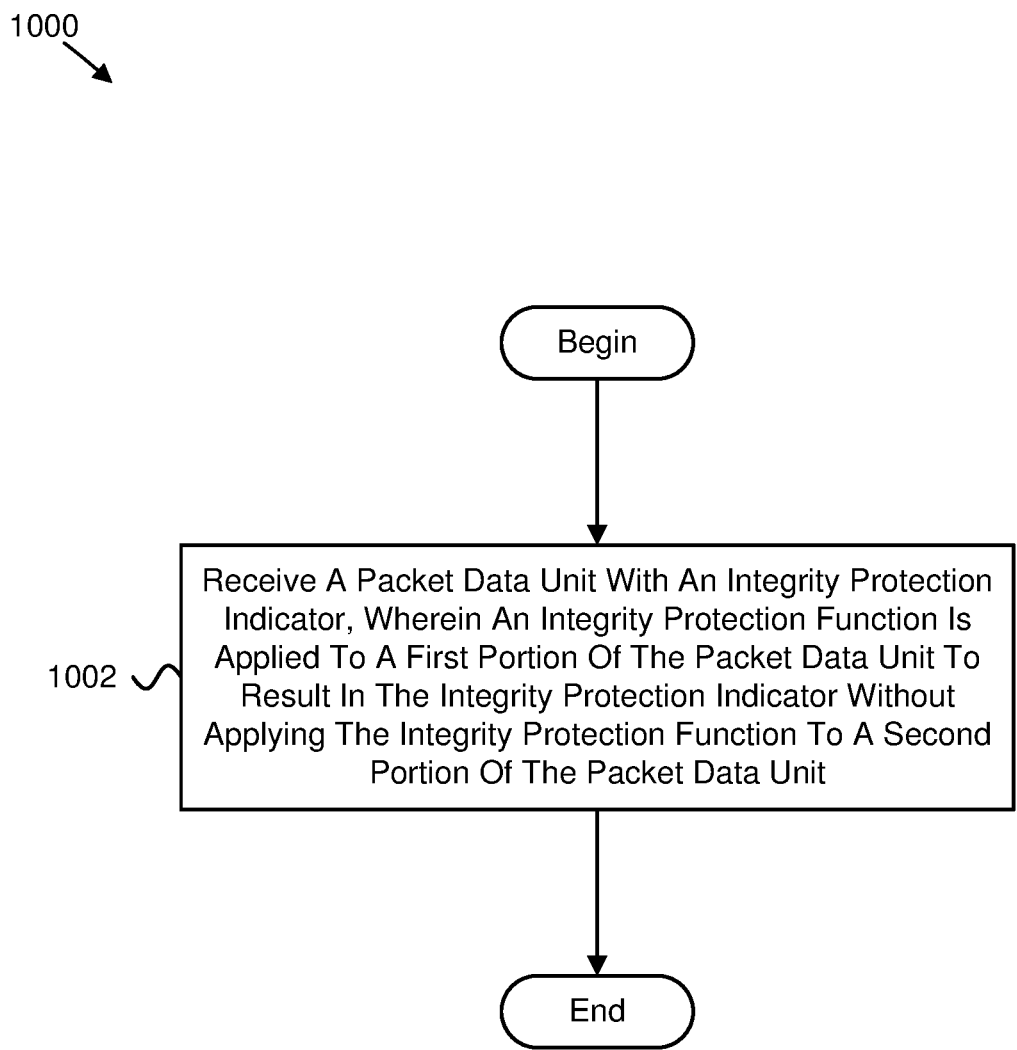
FIG. 10 is a flow chart diagram illustrating another embodiment of a method for integrity protection for a packet data unit.

FIG. 10 is a flow chart diagram illustrating another embodiment of a method 1000 for integrity protection for a packet data unit. In some embodiments, the method 1000 is performed by an apparatus, such as the network unit 104. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002 a packet data unit with an integrity protection indicator, wherein an integrity protection function is applied to a first portion of the packet data unit to result in the integrity protection indicator without applying the integrity protection function to a second portion of the packet data unit.

In certain embodiments, the method 1000 further comprises transmitting information indicating a length of the portion of the packet data unit. In some embodiments, the information indicating the length is transmitted as part of a packet data convergence protocol configuration via a radio resource control message. In various embodiments, the length of the portion of the packet data unit is determined based on a user equipment capability corresponding to integrity protection.

In one embodiment, the method 1000 further comprises transmitting information indicating a location of the portion of the packet data unit within the packet data unit. In certain embodiments, the information indicating the location comprises an offset. In some embodiments, the method 1000 further comprises receiving information indicating a length of the portion of the packet data unit.

In various embodiments, the method 1000 further comprises receiving information indicating a location of the portion of the packet data unit. In one embodiment, the method 1000 further comprises receiving information indicating whether the integrity protection indicator is present. In certain embodiments, the information indicating the length, the location, and the integrity protection indicator is part of a header of a packet data convergence protocol message. In some embodiments, the header is ciphered.

In one embodiment, a method comprises: determining a first portion of a packet data unit, wherein the packet data unit comprises the first portion and a second portion; applying an integrity protection function to the first portion of the packet data unit to result in an integrity protection indicator without applying the integrity protection function to the second portion of the packet data unit; and transmitting the packet data unit with the integrity protection indicator.

In certain embodiments, the method further comprises receiving information indicating a length of the portion of the packet data unit.

In some embodiments, the information indicating the length is received as part of a packet data convergence protocol configuration via a radio resource control message.

In various embodiments, the length of the portion of the packet data unit is determined based on a user equipment capability corresponding to integrity protection.

In one embodiment, the method further comprises receiving information indicating a location of the portion of the packet data unit within the packet data unit.

In certain embodiments, the information indicating the location comprises an offset.

In some embodiments, the method further comprises transmitting information indicating a length of the portion of the packet data unit.

In various embodiments, the method further comprises transmitting information indicating a location of the portion of the packet data unit.

In one embodiment, the method further comprises transmitting information indicating whether the integrity protection indicator is present.

In certain embodiments, the information indicating the length, the location, and the integrity protection indicator is part of a header of a packet data convergence protocol message.

In some embodiments, the header is ciphered.

In various embodiments, the method further comprises, in response to the information indicating that the integrity protection indicator is not present, not transmitting information indicating the length of the portion of the packet data unit and the location of the portion of the packet data unit.

In one embodiment, transmitting the entire packet data unit with the integrity protection indicator comprises transmitting the integrity protection indicator if a higher layer indicates to apply integrity protection and applying integrity protection.

In certain embodiments, the method further comprises transmitting information indicating an ability to support partial integrity protection and a maximum supported bitrate for integrity protection to an access and mobility management function.

In one embodiment, an apparatus comprises: a processor that: determines a first portion of a packet data unit, wherein the packet data unit comprises the first portion and a second portion; and applies an integrity protection function to the first portion of the packet data unit to result in an integrity protection indicator without applying the integrity protection function to the second portion of the packet data unit; and a transmitter that transmits the packet data unit with the integrity protection indicator.

In certain embodiments, the apparatus further comprises a receiver that receives information indicating a length of the portion of the packet data unit.

In some embodiments, the information indicating the length is received as part of a packet data convergence protocol configuration via a radio resource control message.

In various embodiments, the length of the portion of the packet data unit is determined based on a user equipment capability corresponding to integrity protection.

In one embodiment, the apparatus further comprises a receiver that receives information indicating a location of the portion of the packet data unit within the packet data unit.

In certain embodiments, the information indicating the location comprises an offset.

In some embodiments, the transmitter transmits information indicating a length of the portion of the packet data unit.

In various embodiments, the transmitter transmits information indicating a location of the portion of the packet data unit.

In one embodiment, the transmitter transmits information indicating whether the integrity protection indicator is present.

In certain embodiments, the information indicating the length, the location, and the integrity protection indicator is part of a header of a packet data convergence protocol message.

In some embodiments, the header is ciphered.

In various embodiments, the transmitter, in response to the information indicating that the integrity protection indicator is not present, does not transmit information indicating the length of the portion of the packet data unit and the location of the portion of the packet data unit.

In one embodiment, the transmitter transmitting the entire packet data unit with the integrity protection indicator comprises the transmitter transmitting the integrity protection indicator if a higher layer indicates to apply integrity protection and applying integrity protection.

In certain embodiments, the transmitter transmits information indicating an ability to support partial integrity protection and a maximum supported bitrate for integrity protection to an access and mobility management function.

In one embodiment, a method comprises: receiving a packet data unit with an integrity protection indicator, wherein an integrity protection function is applied to a first portion of the packet data unit to result in the integrity protection indicator without applying the integrity protection function to a second portion of the packet data unit.

In certain embodiments, the method further comprises transmitting information indicating a length of the portion of the packet data unit.

In some embodiments, the information indicating the length is transmitted as part of a packet data convergence protocol configuration via a radio resource control message.

In various embodiments, the length of the portion of the packet data unit is determined based on a user equipment capability corresponding to integrity protection.

In one embodiment, the method further comprises transmitting information indicating a location of the portion of the packet data unit within the packet data unit.

In certain embodiments, the information indicating the location comprises an offset.

In some embodiments, the method further comprises receiving information indicating a length of the portion of the packet data unit.

In various embodiments, the method further comprises receiving information indicating a location of the portion of the packet data unit.

In one embodiment, the method further comprises receiving information indicating whether the integrity protection indicator is present.

In certain embodiments, the information indicating the length, the location, and the integrity protection indicator is part of a header of a packet data convergence protocol message.

In some embodiments, the header is ciphered.

In one embodiment, an apparatus comprises: a receiver that receives a packet data unit with an integrity protection indicator, wherein an integrity protection function is applied to a first portion of the packet data unit to result in the integrity protection indicator without applying the integrity protection function to a second portion of the packet data unit.

In certain embodiments, the apparatus further comprises a transmitter that transmits information indicating a length of the portion of the packet data unit.

In some embodiments, the information indicating the length is transmitted as part of a packet data convergence protocol configuration via a radio resource control message.

In various embodiments, the length of the portion of the packet data unit is determined based on a user equipment capability corresponding to integrity protection.

In one embodiment, the apparatus further comprises a transmitter that transmits information indicating a location of the portion of the packet data unit within the packet data unit.

In certain embodiments, the information indicating the location comprises an offset.

In some embodiments, the receiver receives information indicating a length of the portion of the packet data unit.

In various embodiments, the receiver receives information indicating a location of the portion of the packet data unit.

In one embodiment, the receiver receives information indicating whether the integrity protection indicator is present.

In certain embodiments, the information indicating the length, the location, and the integrity protection indicator is part of a header of a packet data convergence protocol message.

In some embodiments, the header is ciphered.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method at a wireless transmitter, the method comprising:
   determining a first portion of a packet data unit, wherein:
      the packet data unit comprises the first portion and a second portion; and
      the first portion comprises a packet data unit header and a first segment of packet data unit data of the packet data unit and the second portion comprises a second segment of the packet data unit data; or
      the first portion comprises the first segment of packet data unit data of the packet data unit and the second portion comprises the packet data unit header and the second segment of the packet data unit data of the packet data unit;
   applying an integrity protection function using an integrity protection key to the first portion of the packet data unit to result in an integrity protection indicator without applying the integrity protection function to the second portion of the packet data unit;
   determining the integrity protection indicator in response to applying the integrity protection function to the first portion of the packet data unit, wherein the integrity protection indicator comprises a plurality of bits; and
   transmitting the packet data unit with the integrity protection indicator, wherein the integrity protection indicator is transmitted after the packet data unit header and after the packet data unit data.

2. The method of claim 1, further comprising receiving information indicating a length of the first portion of the packet data unit.

3. The method of claim 2, wherein the information indicating the length is received as part of a packet data convergence protocol configuration via a radio resource control message.

4. The method of claim 2, wherein the length of the first portion of the packet data unit is determined based on a user equipment capability corresponding to integrity protection.

5. The method of claim 1, further comprising receiving information indicating a location of the first portion of the packet data unit within the packet data unit.

6. The method of claim 5, wherein the information indicating the location comprises an offset.

7. The method of claim 1, further comprising transmitting information indicating a length of the first portion of the packet data unit.

8. The method of claim 7, further comprising transmitting information indicating a location of the first portion of the packet data unit.

9. The method of claim 8, further comprising transmitting information indicating whether the integrity protection indicator is present.

10. The method of claim 9, wherein the information indicating the length, the location, and the integrity protection indicator is part of a header of a packet data convergence protocol message.

11. The method of claim 10, wherein the header is ciphered.

12. The method of claim 9, further comprising, in response to the information indicating that the integrity protection indicator is not present, not transmitting information indicating the length of the first portion of the packet data unit and the location of the first portion of the packet data unit.

13. The method of claim 1, wherein transmitting the entire packet data unit with the integrity protection indicator comprises transmitting the integrity protection indicator if a higher layer indicates to apply integrity protection and applying the integrity protection.

14. The method of claim 1, further comprising transmitting information indicating an ability to support partial integrity protection and a maximum supported bitrate for the integrity protection to an access and mobility management function.

15. An apparatus comprising:
a processor that:
 determines a first portion of a packet data unit, wherein:
  the packet data unit comprises the first portion and a second portion; and
   the first portion comprises a packet data unit header and a first segment of packet data unit data of the packet data unit and the second portion comprises a second segment of the packet data unit data; or
   the first portion comprises the first segment of packet data unit data of the packet data unit and the second portion comprises the packet data unit header and the second segment of the packet data unit data of the packet data unit; and
 applies an integrity protection function using an integrity protection key to the first portion of the packet data unit to result in an integrity protection indicator without applying the integrity protection function to the second portion of the packet data unit;
 determine the integrity protection indicator in response to applying the integrity protection function to the first portion of the packet data unit, wherein the integrity protection indicator comprises a plurality of bits; and
a transmitter that transmits the packet data unit with the integrity protection indicator, wherein the integrity protection indicator is transmitted after the packet data unit header and after the packet data unit data.

16. The apparatus of claim 15, further comprising a receiver that receives information indicating a length of the first portion of the packet data unit.

17. The apparatus of claim 16, wherein the length of the first portion of the packet data unit is determined based on a user equipment capability corresponding to the integrity protection.

18. The apparatus of claim 15, further comprising a receiver that receives information indicating a location of the first portion of the packet data unit within the packet data unit.

19. The apparatus of claim 15, wherein the transmitter transmits information indicating a length of the first portion of the packet data unit.

20. A method comprising:
receiving a packet data unit with an integrity protection indicator, wherein the integrity protection indicator comprises a plurality of bits, the integrity protection indicator is transmitted after the packet data unit header and after the packet data unit data, an integrity protection function is applied to a first portion of the packet data unit using an integrity protection key to result in the integrity protection indicator without applying the integrity protection function to a second portion of the packet data unit, wherein:
 the first portion comprises a packet data unit header and a first segment of packet data unit data of the packet data unit and the second portion comprises a second segment of the packet data unit data; or
 the first portion comprises the first segment of packet data unit data of the packet data unit and the second portion comprises the packet data unit header and the second segment of the packet data unit data of the packet data unit.

* * * * *